United States Patent [19]

Averill et al.

[11] Patent Number: 4,632,194
[45] Date of Patent: Dec. 30, 1986

[54] SELF-PROPELLED SAVERDRILL

[75] Inventors: Stuart A. Averill, 192 Powell Avenue, Ottawa, Canada, K1S 2A5; Lyle W. Hokanson; David G. Kroeker, both of Winnipeg, Canada

[73] Assignee: Stuart A. Averill, Ottawa, Canada

[21] Appl. No.: 666,825

[22] Filed: Oct. 31, 1984

[30] Foreign Application Priority Data

Nov. 8, 1983 [CA] Canada ................................. 440647

[51] Int. Cl.⁴ ......................... E21B 17/18; E21B 7/02; B62D 61/10; F16B 1/00
[52] U.S. Cl. ..................................... 175/217; 173/28; 180/22; 180/24.06; 280/104; 403/389
[58] Field of Search ............. 180/41, 24.06, 45, 24.05, 180/22; 280/104, 676, 677; 403/80, 389, 390, 391, 400; 308/2 R; 173/22, 28, 164; 175/162, 170, 203, 202, 217

[56] References Cited

U.S. PATENT DOCUMENTS

| | | | |
|---|---|---|---|
| 1,647,437 | 11/1927 | Crocker | 180/22 |
| 2,280,741 | 4/1942 | Bolster et al. | 180/24.05 |
| 2,335,171 | 11/1943 | Cornett . | |
| 2,335,172 | 11/1943 | Cornett . | |
| 2,587,969 | 3/1952 | Cornett . | |
| 2,928,322 | 3/1960 | Spitzer . | |
| 3,198,551 | 8/1965 | Garner | 180/24.06 X |
| 3,262,513 | 7/1966 | Henriksson et al. . | |
| 3,299,978 | 1/1967 | Sponsler | 180/22 X |
| 3,313,555 | 4/1967 | Reimer | 280/104 |
| 3,437,163 | 4/1969 | Lemmerman . | |
| 3,525,534 | 8/1970 | Madler et al. | 180/22 X |
| 3,533,642 | 10/1970 | Cederlund . | |
| 3,563,319 | 2/1971 | Nixon . | |
| 3,605,912 | 9/1971 | Fisher . | |
| 3,810,516 | 5/1974 | Reimer | 180/24.05 X |
| 4,229,124 | 10/1980 | Frey et al. . | |

FOREIGN PATENT DOCUMENTS

| | | |
|---|---|---|
| 172600 | 4/1916 | Canada . |
| 571397 | 2/1959 | Canada . |
| 652260 | 11/1962 | Canada . |
| 699059 | 12/1964 | Canada . |
| 767532 | 3/1965 | Canada . |
| 719525 | 10/1965 | Canada . |
| 894112 | 2/1972 | Canada . |
| 965123 | 3/1975 | Canada . |
| 1031763 | 5/1978 | Canada . |
| 1058246 | 7/1979 | Canada . |
| 1076963 | 5/1980 | Canada . |
| 1092986 | 1/1981 | Canada . |
| 50425 | 7/1985 | Canada . |

Primary Examiner—Stuart S. Levy
Assistant Examiner—Thomas R. Hannon
Attorney, Agent, or Firm—Lerner, David, Littenberg, Krumholz & Mentlik

[57] ABSTRACT

There is described a vehicle or vehicle frame including a first elongated sub-frame and a second sub-frame rotatably connected to one end of the first sub-frame for pivotal movement about the longitudinal axis of the first sub-frame. A walking beam is provided at each of the elongated sides of the first sub-frame in parallel, spaced apart relation thereto. A walking beam pivot assembly extends transversely across the first sub-frame adjacent the other end of the first sub-frame and each of the walking beams is pivotally connected at a point intermediate along its length to a respective outer end of the pivot assembly whereby each walking beam is suspended for independent pivotal movement in its own vertical plane. A connector is provided to join a first end of each walking beam to the adjacent end of the second sub-frame to permit simultaneous pivotal movements of the walking beams and the second sub-frame in their respective, mutually perpendicular vertical planes.

48 Claims, 16 Drawing Figures

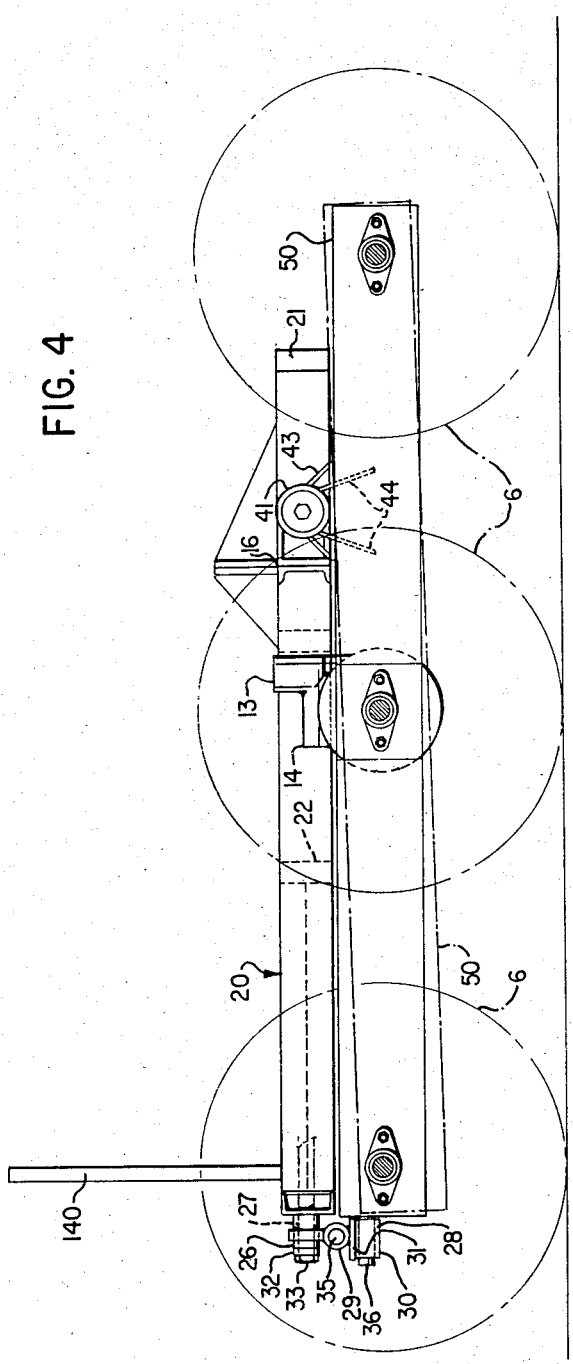

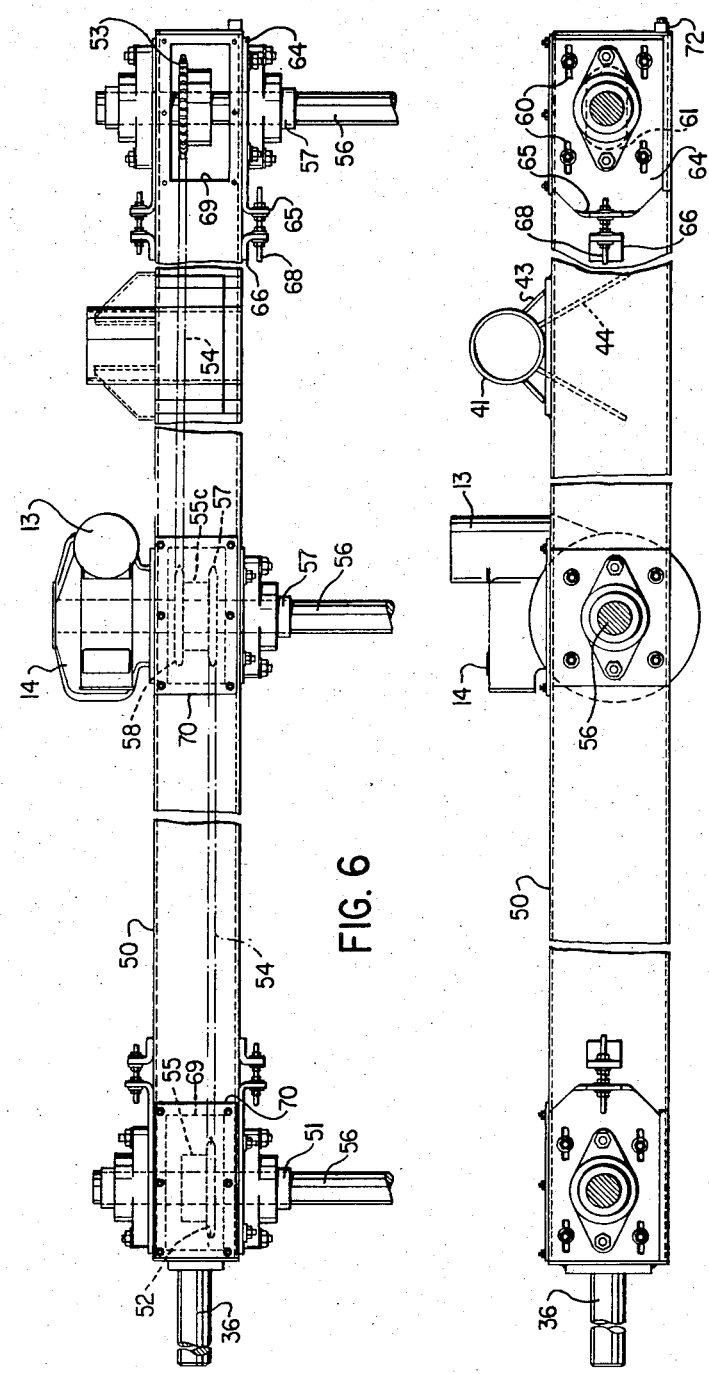

SELF-PROPELLED SAVERDRILL

BACKGROUND OF THE INVENTION

The present invention relates to a vehicle or vehicle frame and more particularly to a vehicle frame forming part of an off-road self-propelled vehicle.

In the fields of mineral exploration and geology in general, samples of overlying sediment and underlying or outcropping rock formations are often obtained by drilling for suitable specimens. It is common practice when sampling unconsolidated sediments to auger a hole to obtain the required samples by removing entrained sediments from the auger flight. Hard rock specimens are obtained usually by diamond drilling the formation and sampling the cores brought up the tubular drill stem of the drill rod.

Diamond drills are usually flown or barged to a point closest the drill site and are then dragged to the site for setup using some form of relatively heavy tracked vehicle for this purpose. Self-propelled drills are known of course but these are usually mounted on trucks having limited off-road capabilities. Such truck-mounted drills are relatively large vehicles, the trucks typically having at least three axles necessitating that expensive roads be cleared to the drill site to provide proper access.

Known off-road self-propelled drills are large and cumbersome and are not easily transportable by air. At the opposite extreme, "backpack" portable drills are available but their effectiveness is limited by their relatively low power outputs and the difficulties associated with human transport over rough terrain or long distances.

In addition to the foregoing, known drills, particularly the larger variety, are not readily adaptable for use as both diamond drills and augers.

What is required is a vehicle capable of propelling itself and related supported drilling equipment over rough terrain, which is sufficiently powerful to be capable of use in place of known, more cumbersome units and which is sufficiently light and simple to be easily dismantled for transport in the various small aircraft used in support of mineral exploration activities in this and other countries. Fundamental to a vehicle of this sort is its frame and the manner in which the frame is assembled to facilitate off-road traversals.

Although the present vehicle and its frame are described hereinbelow in terms and in the context of a self-propelled drill, it will be appreciated throughout that this particular application of the present vehicle is merely exemplary and that the present frame assembly and the vehicle of which it forms a part will find many advantageous and useful applications in various modes of off-road use.

SUMMARY OF THE INVENTION

In view of the foregoing, it is an object of the present invention to provide an off-road vehicle which obviates and mitigates from the disadvantages of known vehicles.

It is also an object of the present invention to provide an improved off-road vehicle having a pair of walking beams pivotally suspended from the vehicle frame, the walking beams supporting the ground engaging wheels of the vehicle to provide greater all-terrain capabilities.

It is a further object of the present invention to provide an improved off-road vehicle having first and second sub-frames pivotally connected to each other and wherein the walking beams are suspended from the first sub-frame and are connected to the second sub-frame to permit independent pivotal movements of the walking beams and the second sub-frame in their respective, mutually perpendicular vertical planes.

According to the present invention, then, there is provided a vehicle frame comprising a first elongated sub-frame, a second sub-frame rotatably connected to one end of the first sub-frame for pivotal movement about the longitudinal axis of the first sub-frame, a walking beam provided at each of the elongated sides of the first sub-frame and disposed in parallel, spaced apart relation thereto, a walking beam pivot assembly extending transversely across the first sub-frame adjacent the other end thereof, each of the walking beams being pivotally connected at a point intermediate along its length to a respective outer end of the pivot assembly for independent pivotal movement of each walking beam in the vertical plane thereof, and connecting means joining a first end of each of the walking beams to the adjacent end of the second sub-frame to permit the simultaneous pivotal movement of the walking beams and the second sub-frame in their respective, mutually perpendicular vertical planes.

According to another aspect of the present invention, there is also provided a vehicle for off-road use comprising a first elongated sub-frame, a second sub-frame rotatably connected to one end of the first sub-frame for pivotal movement about the longitudinal axis of the first sub-frame, a walking beam provided at each of the elongated sides of the first sub-frame and disposed in parallel, spaced apart relation thereto, a walking beam pivot assembly extending transversely across the first sub-frame adjacent the other end thereof, each of the walking beams being pivotally connected at a point intermediate along its length to a respective outer end of the pivot assembly for independent pivotal movement of each walking beam in the vertical plane thereof, and connecting means joining a first end of each of the walking beams to the adjacent end of the second sub-frame to permit the simultaneous pivotal movement of the walking beams and the second sub-frame in their respective mutually perpendicular vertical planes, ground engaging wheel means provided on each of the walking beams, drive means for rotating the wheel means, and a prime mover mounted on the vehicle for actuating the drive means.

BRIEF DESCRIPTION OF THE DRAWINGS

Embodiments of the present invention will now be described in greater detail and will be better understood when read in conjunction with the following drawings in which:

FIG. 4 is a side elevational view of the frame of FIG. 2;

FIG. 6 is a plan, partially cut away view of a walking beam forming part of the frame of FIG. 2;

FIG. 7 is a side elevational view of the walking beam of FIG. 4;

DESCRIPTION OF PREFERRED EMBODIMENTS

Figure 1:
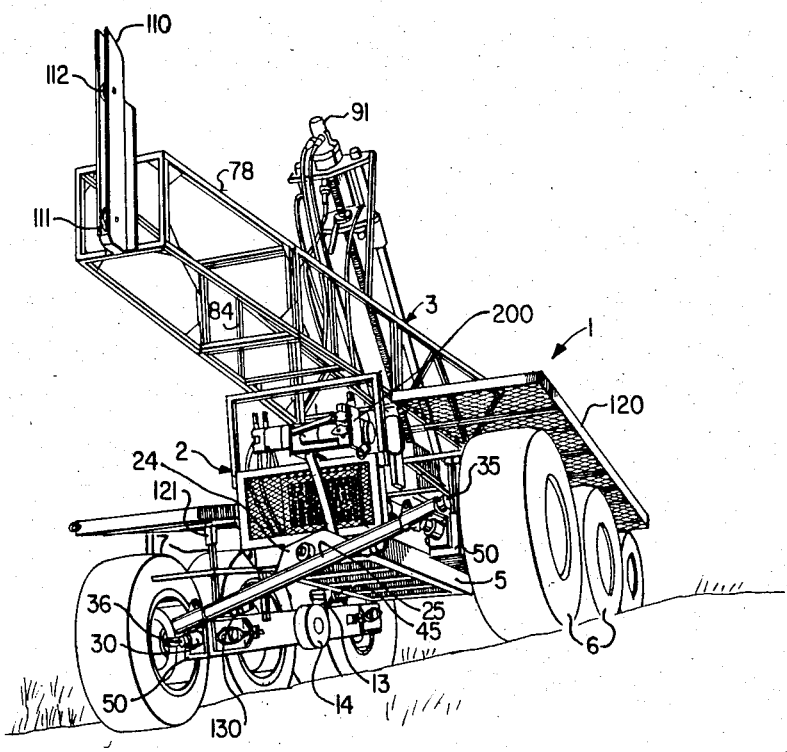
FIG. 1 is a perspective view of the vehicle described hereinbelow.

With reference to the Figures, there is shown the present vehicle frame forming part of the self-propelled drill illustrated in FIG. 1.

The drill, indicated generally by the number 1 includes two major sub-assemblies, namely, vehicle 2 and drilling assembly 3 mounted thereon.

Figure 2:
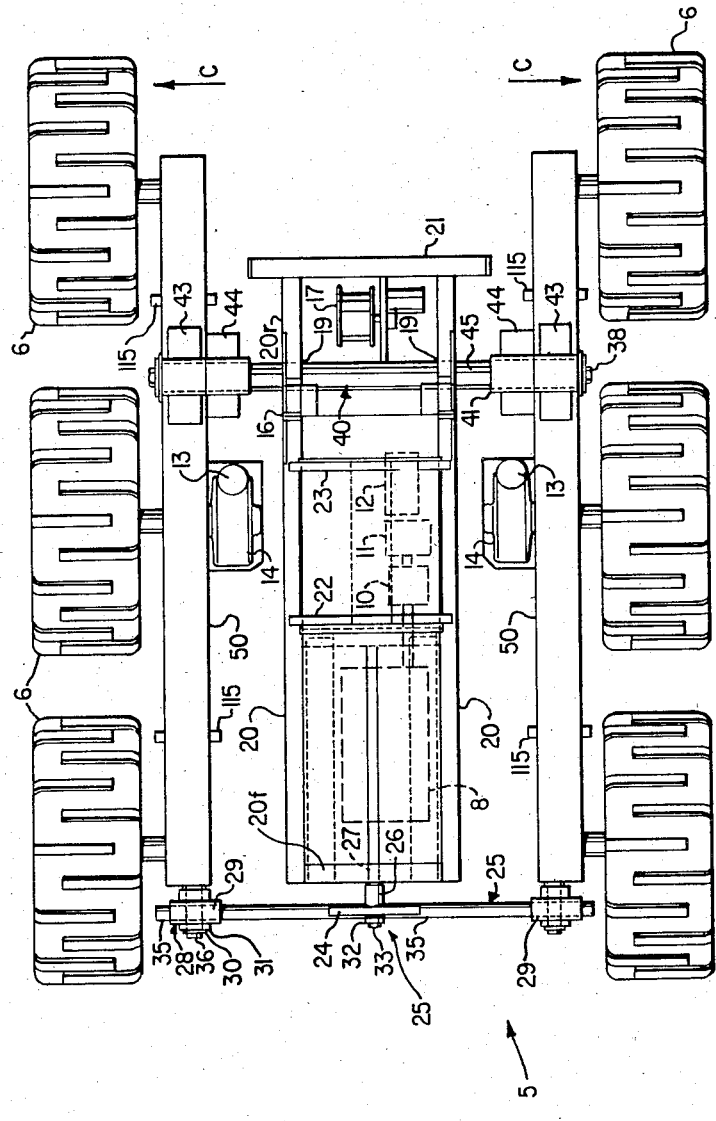
FIG. 2 is a plan, partially schematic, view of the frame of the vehicle of FIG. 1.
Figure 13:
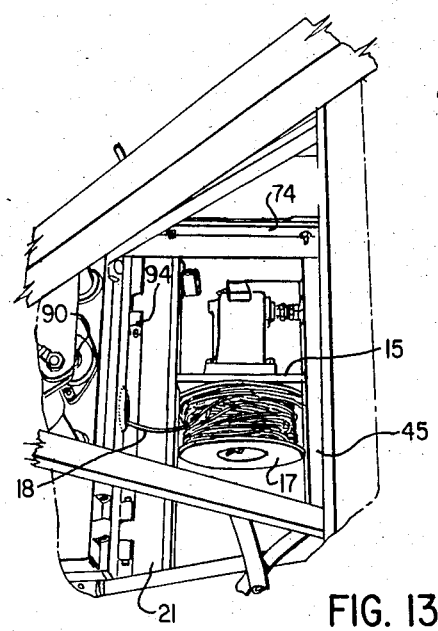
FIG. 13 is a downwardly looking view onto a winch assembly.

With reference to FIGS. 1 and 2, vehicle 2 includes frame 5, ground engaging wheels 6 and prime mover 8 including tandem hydraulic pumps 10 and 11, all shown schematically, operable to respectively actuate each of hydraulic motors 13 which drive ground engaging wheels 6, and hydraulic pump 12 for driving a winch 17 (FIG. 13) and drill feed motor 91. As will be described in greater detail below, pump 10 doubles to operate an hydraulic motor 96 (FIG. 9) for drill rotation and pump 11, in addition to operating one of motors 13, actuates a drilling fluid pump such as a water and mud pump 200 as well. The water pump is utilized during drilling operations to flush and lubricate the hole when either diamond or auger drilling. Vehicle 2 includes of course many additional components and sub-assemblies, the details of which have been left for description below.

With reference now to FIGS. 2 and 4, frame 5 includes a main elongated sub-frame 20 which is generally rectangular in shape as shown and which may be suitably fabricated from steel stock of generally rectangular cross-sectional configuration. Main sub-frame 20 is divided into a forward portion 20f and a rearward portion 20r joined together at 16. The rearward portion of main frame 20 includes a transversely extending end member 21, the ends of which project laterally beyond the sides of main frame 20. Main frame 20 additionally includes various structural cross-members such as 22 and 23 for additional rigidity and to support the prime mover, hydraulic pumps and other sub-assemblies mounted thereon.

Figure 3:
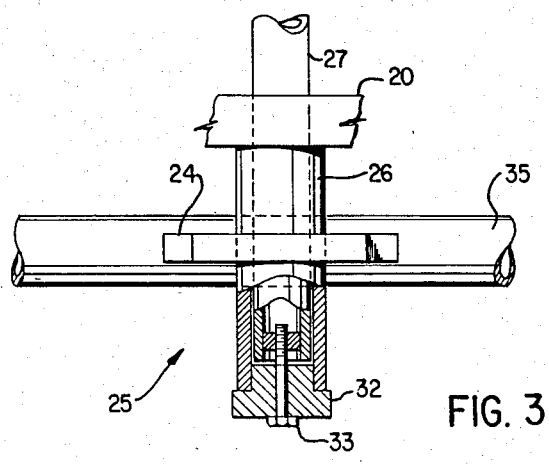
FIG. 3 is a detailed plan, partially sectional view of part of the frame illustrated in FIG. 2.

Pivotally connected to the forwardmost end of sub-frame 20 is a second sub-frame 25 which is mounted about a shaft 27 for pivotal movement about the longitudinal axis of sub-frame 20. With reference to FIGS. 2 and 3, sub-frame 25 may very simply consist of a transversely mounted elongated rod member such as a tube 35 fixedly connected by means of welding or the like to a bushed plate 24. Plate 24 is apertured to receive a bushing or sleeve 26 which concentrically fits about the forwardly extending end of shaft 27. Sleeve 26 is retained in place by means of a cap 32 which is bolted to the end of shaft 27. As will be seen most clearly from FIG. 3, cap 32 is generally T-shaped to fit into and over the end of sleeve 26. A bolt 33 is threadedly received through the cap to engage a correspondingly threaded perforated plate welded into the end of shaft 27, which, obviously, is hollow. By tightening the bolt, sleeve 26 can be biased into abutment with the end of frame 20.

Disposed on the opposite elongated sides of subframe 20 are walking beams 50 which are pivotally connected to sub-frame 20 by means of a pivot assembly 40. Pivot assembly 40, which includes an elongated cylindrical outer tube 45, extends through apertures 19 formed into sub-frame 20 at points inwardly adjacent end member 21 and each walking beam 50 is connected to the ends of pivot assembly 40 for independent pivotal movement relative thereto. As will be appreciated, walking beams 50 are thus free to pivot about their transverse axes in a scissors-like movement in their respective vertical planes relative to sub-frame 20 as shown by dotted lines in FIG. 4.

Figure 5:
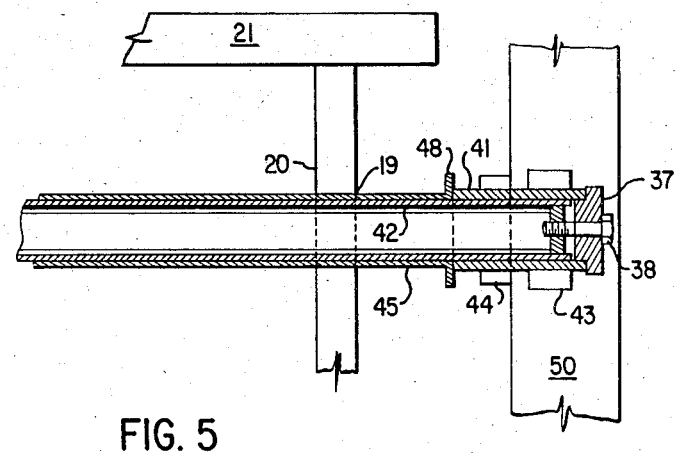
FIG. 5, appearing with FIG. 3 of the drawings, is a detailed, partially sectional view of part of the frame illustrated in FIG. 2.

As will be seen from FIG. 2, the outer ends of pivot assembly 40 are fitted with rotatable sleeve members 41 which are fixedly connected to beams 50 by any suitable means such as welded flanges 43 and 44. Sleeves 41 are connectable to assembly 40 in any suitable fashion so as to be rotatable relative thereto. One manner of accomplishing this is shown in FIG. 5. As will be seen, sleeves 41 fit concentrically over the ends of an inner tube such as rotatable shaft 42 so as to be rotatable with the shaft. Shaft 42 fits concentrically within tube 45 and is longer so that its ends extend axially beyond the ends of tube 45. The sleeves are each held in place by retaining means consisting of a cap 37 similar in shape to cap 32 and which fits the outer ends of sleeves 41 in the same manner as cap 32 fits the end of sleeve 26. Each of caps 37 is connected to a respective end of the shaft 42 by means of a threaded member such as a bolt 38 which engages a correspondingly threaded aperture formed in a perforated plate welded into each end of the shaft. By tightening bolts 38, sleeves 41 can be snugged or biased against flanges 48 welded to cylindrical tube 45 adjacent its outer ends. Lubricant between sleeve 41 and rotatable shaft 42 may be provided by any well known means such as a grease nipple.

Cylindrical tube 45 is welded to the frame at apertures 19 and forms the forwardmost structural crossmember of rear sub-frame portion 20r.

Those skilled in the art will appreciate that other means of rotatably connecting sleeves 41 to assembly 40 are possible, as are other means of pivotally connecting walking beams 50 to sub-frame 20, and it is contemplated that other means may be utilized without departing from the inventive concept herein.

Each of walking beams 50 extends from a point rearwards of sub-frame 20 to a point just behind sub-frame 25. The forwardmost ends of beams 50 include longitudinally extending cylindrical members such as pins or rods 36 that are arranged to pass perpendicularly beneath the cylindrical ends of tube 35. Ends 35 and pins 36 are interconnected by connecting means consisting of a cross-shaped double sleeve assembly 28 which permits independent simultaneous pivoting movements of beams 50 and sub-frame 25 in their respective vertical planes.

It will be appreciated that the expression "vertical plane" describes the planes extending perpendicularly to the horizontal plane defined by sub-frame 20. It will be clearly understood that as the present vehicle traverses rough terrain, the plane of pivotal movements of sub-frame 25 and walking beams 50 will depart somewhat from the vertical to reflect the attitude of the vehicle as a whole. The expression "vertical plane" is therefore intended to embrace deviations from the vertical due to changes in the attitude of the present vehicle when traversing irregular and non-level surfaces.

Sleeve assembly 28 consists of two mutually perpendicular superimposed sleeves 29 and 30 of sufficient diameter to slidably and loosely engage the ends of tube 35 and pins 36, respectively. The two sleeves are interconnected by an intermediate plate 31 to which the sleeves are welded and as will be observed, sleeve assembly 28 is not in any way secured to beams 50 or sub-frame 25, the nature of its connection to tube 35 and pins 36 alone holding it securely in place.

To propel vehicle 2 of which frame 5 forms a part, it is necessary to provide drive units 55 within walking beams 50 for each of wheels 6.

With reference now to FIGS. 6 and 7, each of rectangular walking beams 50 is hollow to receive therein three drive units 55, the centre unit 55c of which is driven directly by an hydraulic motor 13/speed reducer 14 assembly. The two outer units are driven indirectly by a sprocket and chain drive assembly. Each drive unit includes a transversely extending rotatable shaft 56 journalled to the walking beam by means of an outer bearing 51. Centre unit 55c includes two sprockets 57 and 58 mounted onto shaft 56, one of which sprockets is aligned with a sprocket 52 provided on the shaft of the forwardmost drive unit 55 and the other of which sprockets is aligned with a sprocket 53 provided on the shaft of the rearmost drive unit. Chains 54 linking sprocket 58 to sprocket 53 and sprocket 57 to sprocket 52 transmit motor power to the outer drive units to provide the vehicle with full six-wheel drive. Wheels 6 are mounted onto the outwardly projecting ends of shafts 56 in any suitable fashion.

For some applications, it may be desired to provide four rather than six ground engaging wheels in which case the centre drive wheels as illustrated may be eliminated. The hydraulic motor/speed reducer assembly is utilized to directly drive either the forward or rearmost ground engaging wheels, the remaining wheels being chain driven.

It is possible to provide each ground engaging wheel with its own drive motor but of course this will entail additional expense and will add additional weight to the vehicle. There are as well practical difficulties involved in ensuring equal RPM on each wheel on the same side.

The precise positions of outer drive units 55 are adjustable within a limited range to facilitate the proper tensioning of chains 54. To this end, each of outer units 55 is adjustable within the limits allowed by slots 60 and 61 provided for the drive unit mounting bolts and shafts 56, respectively. Each of the outer drive units 55 includes an outer plate 64 which is bent outwardly as at 65 to form a flange. Opposing flanges 66 are welded to beam 50 as shown and a threaded rod 68 is received through aligned apertures formed in the flanges 65 and 66. Using a suitable system of nuts and washers such as shown to position rod 68, units 55 may be adjusted in the longitudinal direction of beam 50 to tighten or slacken the tension in chain 54. When chain tension has been suitably adjusted, the various mounting bolts passing through slots 60 may be tightened to secure units 55 firmly in place.

To provide access to the drive units, apertures 69 are cut into the upper surfaces of beams 50 immediately above each of units 55. A covering plate 70 is bolted to the beam about each of the apertures to seal same when the vehicle is in use.

To provide lubrication for the drive assemblies, beams 50 are filled or partially filled with lubricating oil which may be periodically drained by removing a drain plug 72 provided at either ends of beams 50.

Figure 8A:
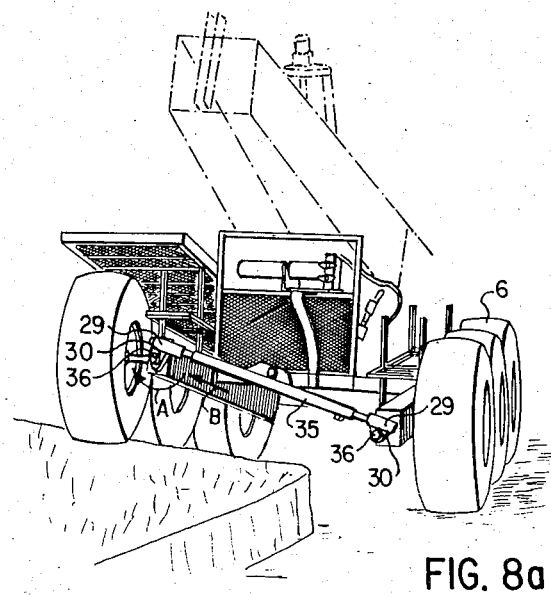
FIG. 8A is a schematical representation of the vehicle of FIG. 1 in operation.

FIGS. 8A and B illustrate beams 50 with wheels 6 attached thereto and show how the frame structure as described above permits the vehicle to easily accommodate itself to the extremes of rough terrain.

In FIG. 8A, the right side of the vehicle is encountering an abrupt hillock whereas the left side of the vehicle remains on relatively flat or perhaps slightly downwardly inclined ground. As can be seen, the wheels on the right side of the vehicle begin to mount the hillock causing right side beam 50 to pivot in a clockwise direction relative to sub-frame 20 about pivot assembly 40. At the same time, the left side beam pivots in a counterclockwise direction about pivot 40 and sub-frame 25 pivots in a clockwise direction about shaft 27 in the vertical plane perpendicular to the vertical planes of movement of beams 50. While all this is happening, sub-frame 20 remains, somewhat remarkably, almost level and is relatively unstressed in view of the fact that it is in effect suspended from pivot assembly 40 which is the main load-bearing component of the present vehicle.

With continued reference to FIG. 8A, it will be appreciated that the coordinated pivotal movements of sub-frame 25 and beams 50 are made possible by the interaction of sleeve assembly 28 with the ends of tube 35 and the pins 36 provided on the ends of the beams. Sleeves 30 rotate about pins 36 in the direction indicated by arrows A while the increase in the diametric distance between leading wheels 6 due to the pivoting of subframe 25 is accommodated by the outward movement of sleeves 29 along the ends of tube 35 in the directions indicated by arrows B.

Figure 8B:
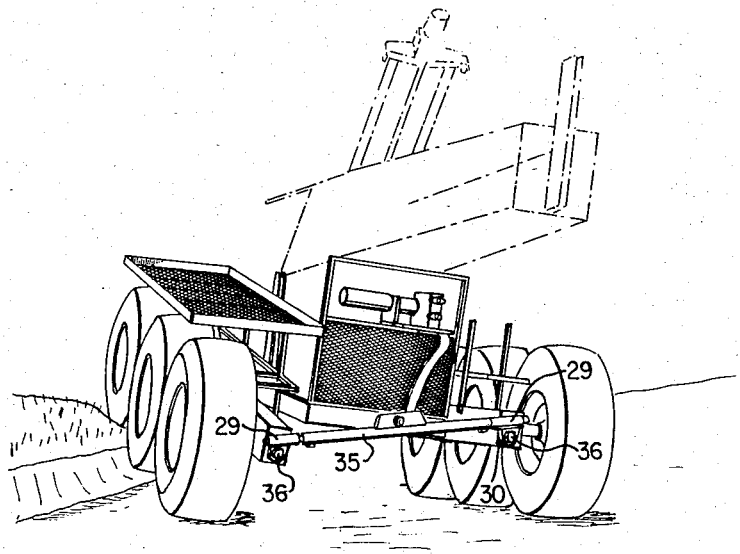
FIG. 8B is a further schematical representation of the vehicle of FIG. 1 in operation.

Turning now to FIG. 8B, the vehicle is shown descending a hillock, the left side of the vehicle remaining on relatively flat or slightly downwardly sloping ground.

Descending the hillock, the right side beam is now seen to have pivoted counterclockwise relative to subframe 20 whereas the left side beam has pivoted in a clockwise direction. Sub-frame 25 has also reversed its orientation to be pivoted in a counterclockwise fashion relative to sub-frame 20 reflecting the still elevated attitude of the rearward end of right side beam 50. Again, it will be seen that sub-frame 20 remains relatively level.

The flexibility of the present vehicle frame will be appreciated from the foregoing illustration which is exemplary only. The present frame is capable of accommodating itself to an extremely broad range of off-road topographic configurations, maintaining sub-frame 20 in a relatively level and unstressed condition in most situations.

As mentioned previously, it is important for transport purposes that the present vehicle be dismantleable into smaller, lighter sub-assemblies. For instance, it may be necessary when utilizing relatively small aircraft such as a DeHavilland Beaver to transport the present drill piece by piece. Rapid and relatively simple dismantling into at least a few major sub-assemblies is therefore highly desirable.

With reference to FIG. 2, the present vehicle can be quickly and easily dismantled to remove each of beams 50 and the tires attached thereto simply by disconnecting the hydraulics to motors 14 and removing bolts 38. The walking beams may then be simply pulled away from the remainder of the vehicle in the direction indicated by arrow C so that sleeves 41 and 29 slidingly disengage pivot assembly 40 and tube 35, respectively. Reassembly is equally quick and simple.

With reference now to FIGS. 9 to 12, the present vehicle is shown outfitted for use as a self-propelled drill. Certain components have been removed for greater clarity whereas other components, particularly prime mover 8, which may be a small diesel engine, hydraulic pumps 10, 11 and 12 and hydraulic reservoir 15 are shown schematically.

It will be appreciated that the present vehicle also includes and has mounted thereon such additional items as a fuel tank, battery and radiator for the prime mover and various filters, coolers, valves and controls for the hydraulics. These items comprise standard hardware and their provision and mounting onto sub-frame 20 together with that of the prime mover and hydraulic pumps themselves involves the utilization of engineering and mechanical principles well known and familiar to those skilled in the art. Accordingly, further details of the exact manner in which the foregoing sub-assemblies are mounted onto sub-frame 20 will not be provided herein as such details will be readily discernible by those skilled in the art having regard to the teachings hereof.

Figure 9:
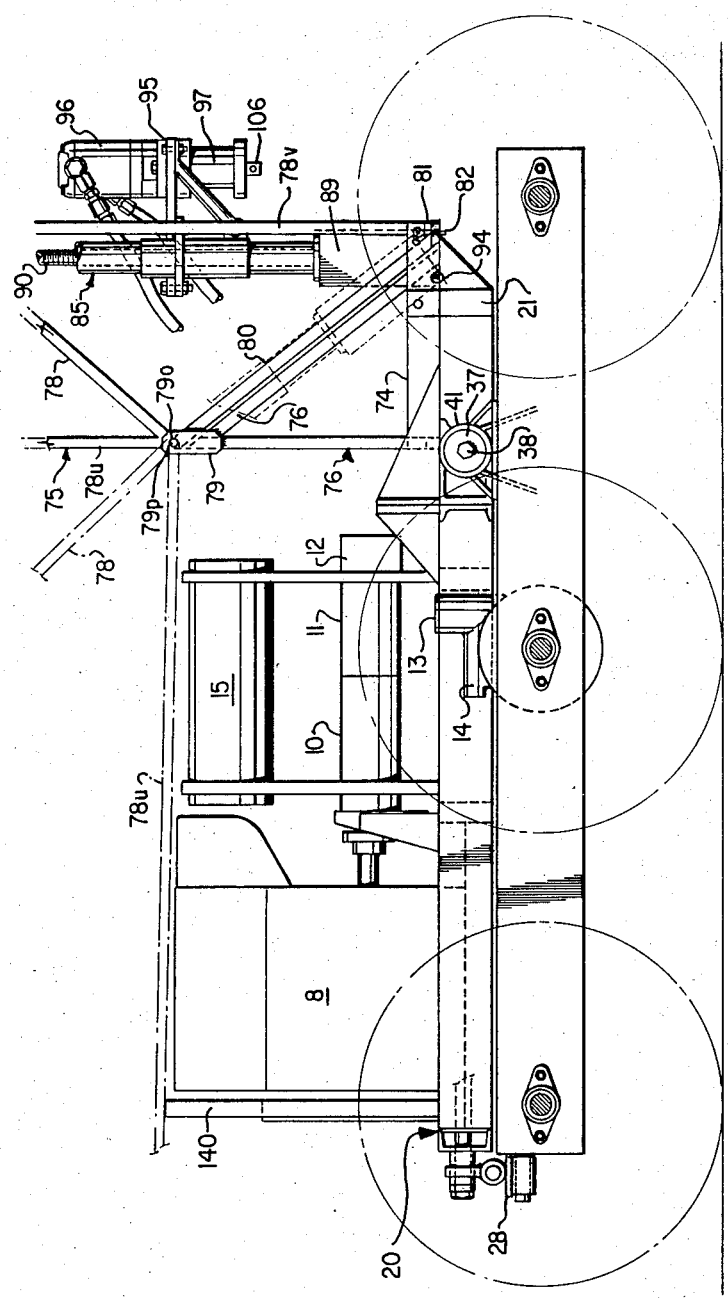
FIG. 9 is a side elevational, partially sectional view of the vehicle of FIG. 1.
Figure 10:
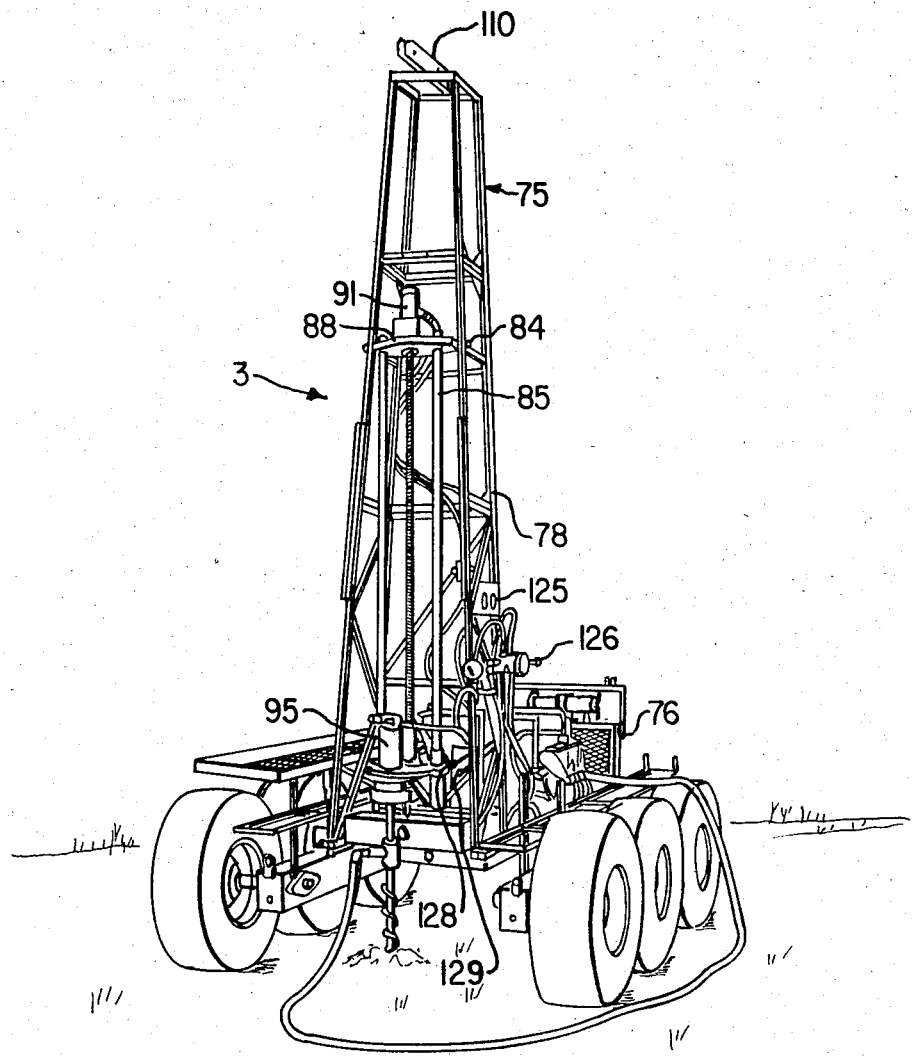
FIG. 10 is a rear perspective view of the vehicle of FIG. 1.

With reference now to FIGS. 9 and 10, drilling means 3 generally include a derrick 75, a screw feed assembly 85, drilling head 95 and a winch 17 (FIG. 13) mounted at the base of the drill tower.

Figure 11:
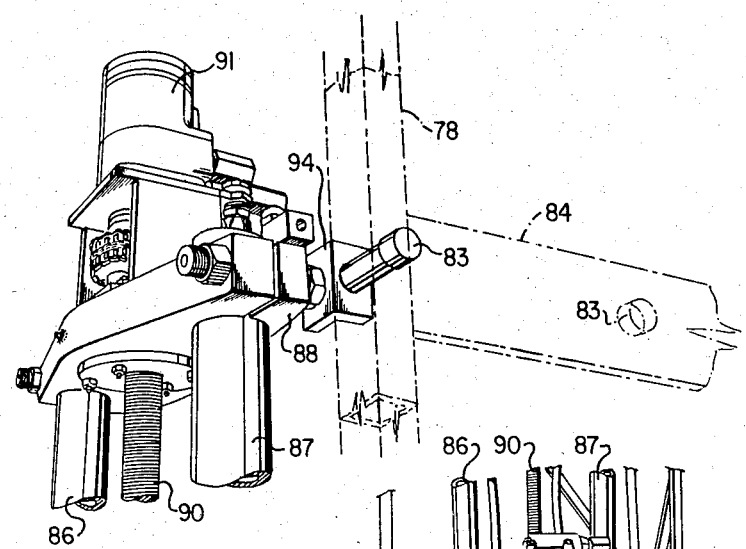
FIG. 11 is a rear perspective view of part of a screw feed assembly.
Figure 12:
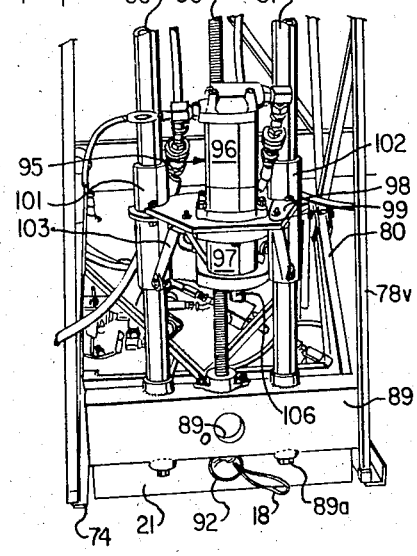
FIG. 12 is a rear perspective view of another part of the screw feed assembly.

Screw feed assembly 85, shown most clearly in FIGS. 11 and 12, is used to raise and lower drilling head 95 during drilling operations and is conventional in configuration. It includes two elongated parallel spindles 86 and 87 interconnected at their upper ends by a bracket 88 on which is mounted a screw feed drive motor 91 and at their lower ends by a buttress or base plate 89 to which the spindles are attached such as by means of bolts 89a. Vertically disposed between the spindles is a threaded rod or jack screw 90 which is journalled at its lower end into buttress 89 and which is similarly journalled at its upper end through bracket 88 for connection to motor 91. Motor 91, which may be a Char-Lynn S.Ser, is hydraulically actuated by pump 12 to rotate jack screw 90 in the clockwise and counterclockwise directions for raising and lowering drill head 95 as will be described below.

Buttress 89 is hingedly connected to end member 21 of sub-frame 20 as at hinges 94 so that screw feed assembly 85 may be tilted forwardly at an angle of approximately 45° as indicated by dotted lines in FIG. 9 when the vehicle is in its drive mode.

End member 21 includes an aperture 92. A similar aperture 89o is formed in the buttress. Through either of these apertures may be passed a wire line 18 from winch 17. Winch 17 (FIG. 13), used to hoist drill stem and auger flight from the hole being drilled and also to pull the vehicle from entrapment situations, is mounted between end member 21 and outer cylindrical tube 45 of pivot assembly 40 such as by means of a transversely extending plate 15, through which the winch's windlass (not shown) is journalled such as will be seen most clearly from the view of FIG. 13. Winch 17 is hydraulically actuated by pump 12 and is so mounted that its spool is aligned with apertures 89 and 92 to feed cable 18 therethrough.

Screw feed assembly 85 is, as mentioned above, actuatable to raise and lower drill head 95. The drilling head, which includes an hydraulic drill motor 96 driven by pump 10 and a thrust bearing 97, are bolted or otherwise affixed to a base plate 98 as shown. Plate 98, which is substantially trapezoidal in shape, is formed having two semi-circular recesses 99 formed therein adjacent the forwardmost corners thereof. Recesses 99 are shaped to partially encircle tubular sleeves 101 and 102 which are slidably mounted for longitudinal movement along spindles 86 and 87. Each of sleeves 101 and 102 include a horizontal flange as shown to which plate 98 may be bolted. Plate 98 is additionally supported by means of braces 103 which extend diagonally between the plate and the lower ends of sleeves 101 and 102.

A threaded bushing (not shown) provided on plate 98 engages jack screw 90. Thus, as screw 90 is rotated, drilling head 95 is either lowered to provide downward drilling pressure or raised to withdraw the drill from the hole.

As mentioned previously, it is desirable for a drill of this type to be adapted for either diamond or auger drilling. For this purpose, thrust bearing 97 is provided with a chuck 106 for connection to either auger flights or to diamond drill rods. Chuck 106 includes an aperture through which a pin is inserted for connecting the auger flights or drill rod.

Augering and diamond drilling require different rotational speed ranges. It has been found more convenient to use two interchangeable hydraulic motors to provide the two speed ranges required rather than a single motor with a transmission. Existing transmissions are relatively large and interfere with the winching operations when pulling drill rod or augers from the hole. On the other hand, it is relatively quick and simple to replace motor 96 with another motor providing a different speed range. The motor not in use is simply stored with the other equipment carried by the vehicle.

The speed of rotation of motor 96 within its operational range is controlled hydraulically, the thrust bearing 97 being utilized to transmit power from motor 96 to chuck 106.

With reference to FIGS. 9 and 10, screw feed assembly 85 is supported in the upright position by derrick 75. Derrick 75 itself is subdivided into a fixed base portion 76 rigidly connected to sub-frame 20 and an upper portion or tower 78 which is pivotally connected to base 76.

The lowermost members of base 76 consist of angle-irons 74 which are bolted to sub-frame 20 so that the ends thereof project rearwardly of end member 21.

The remainder of base 76 is fabricated from rectangular stock as shown to form what from the side appears to be a right-angled triangle. A hinge plate 79 having an aperture 79o is welded or otherwise affixed to the upper apices of the triangles forming each side of base 76.

Tower 78 is formed to have any suitable configuration of substantially upright and horizontal and diagonal cross members such as shown to provide sufficient rigidity and strength and to allow the tower to be disassembled into two or three shorter segments for easier transport particularly by air.

The upper portion of the derrick is adapted for pivotal connection to hinge plates 79 such as by means of apertures formed through upright members 78u for alignment with the apertures formed in hinge plate 79. A removable hinge pin 79p may be removably inserted to hold the derrick segments together.

From the point of connection of the tower to hinge plate 79, each side of tower 78 consists of a diagonally extending cross member 80 which parallels the hypotenuse of base 76. Cross members 80 are connected to uprights 78v by means of a short horizontal cross member 81. Members 81 rest upon the horizontal flanges of extended angle irons 74 to support the tower in an upright position and may be fixed in this position by means of retractable pins or bolts 82 as shown.

When the drill is moving about, tower 78 may be pivoted about hinge 79 as shown in dotted lines in FIG. 9 to rest in an out-of-the-way position upon a frame 140 welded to sub-frame 20 adjacent the forward end thereof for this purpose.

About two-thirds of the way up the tower, rectangular strips of metal 84 are welded or otherwise affixed to the sides of the tower as shown and into each strip are formed at least two apertures 83 (FIG. 11). To fix the screw feed assembly in place by connection to the tower, the bracket 88 located adjacent the top of the screw feed assembly includes a pair of opposed apertured flanges 94. In the upright drilling position of the screw feed assembly, the rearward apertures formed in flanges 94 align with the apertures in strip 84 to receive a retractable pin or bolt therethrough. To winch rods or augers from the drill hole without obstruction of winch cable 18 by drill head 95, screw feed assembly 85 is tilted forward slightly towards its reclining position and pinned to the forward apertures in strip 84.

When the pins have been removed and tower 78 is pivoted to a resting position against brace 140, screw feed 85 may be pivoted as well to rest against the derrick as illustrated in phantom lines in FIG. 9.

At its top, tower 78 includes a channel 110 comprising two spaced apart plates which enclose and support a pair of rotatable pulleys 111 and 112 (shown in FIG. 1). Wire line 18 from winch 17 may be entrained about pulley 111 and then 112 and then led downwardly for connection to the downhole drill string for hoisting purposes. Wire line 18 may also be used for extracting core samples from the diamond drill rods using well known apparatus for this purpose.

An instrument panel 125 including temperature and pressure gauges may be fastened to one side of the tower together with any other required hydraulic controls such as a selector 126 for reversing feed motor 91 and winch 17. Attached to the upright member 78v of base 76 are two control levers 128 and 129 which are utilized to independently control each set of drive wheels 6 for forward, reverse or neutral rotation when the vehicle is in the drive mode and which double as water pump and drill speed controls when the vehicle is converted to the drill mode. To this end, each of pumps 10, 11 and 12 are provided with selectors to divert the flow of hydraulic fluid from one function, such as driving motors 13, to another function, such as actuating drill motor 96. Pumps 10 and 11 are responsible for actuating drive motors 13, drill head 95 and a water pump (not shown) whereas pump 12 operates screw feed motor 91 and winch 17.

Figure 14:
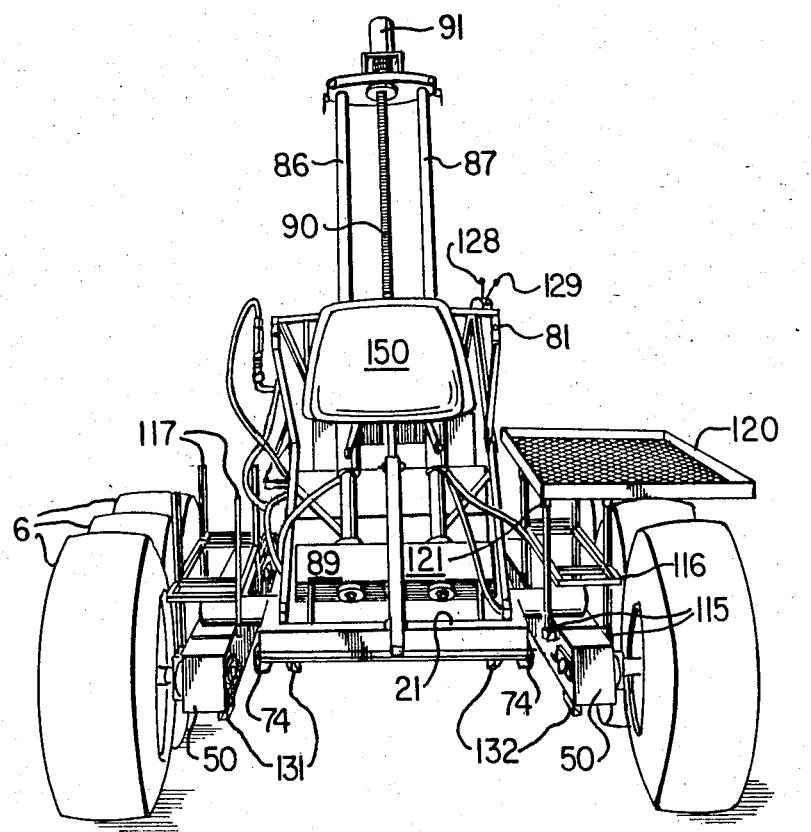
FIG. 14 is a rear perspective view of the vehicle of FIG. 1 showing additional features thereof.

Reference will now be made to FIG. 14 which illustrates vehicle 2 with much of its ancillary equipment and machinery removed for greater clarity. The vehicle is in its drive mode, that is, tower 78 and screw feed assembly 85 are in their reclined positions, and a removable operator's seat 150 having an inverted T-shaped base is bolted or pinned to the horizontal flanges of angle irons 74 using the same apertures through which bolts 82 are inserted to secure tower 78 in an upright position. The operator, seated in this position, is able to readily manipulate levers 128 and 129 which now extend vertically from now horizontal member 78v to control each row of drive wheels 6.

To provide storage for the augers, drill rods and other equipment needed for drilling purposes, each of walking beams 50 is provided with a plurality of welded-on brackets 115. Two of these brackets are provided on opposite sides of beam 50 adjacent one end thereof and the other two are similarly disposed adjacent the other end of the beam. A frame 116 including uprights 117 is fitted into the brackets and a storage rack 120 is fitted to the upper ends of uprights 117. Rack 120 includes a plurality of brackets 121 connected to its underside and which slidably engage the tops of uprights 117 for this purpose. Axially aligned apertures may be formed into brackets 115 and 121 and uprights 117 so that retaining pins or bolts may be inserted therethrough to prevent the frames and racks from being jarred loose.

For levelling purposes or to raise the vehicle above the ground, jacks may be utilized which are fitted into brackets conveniently provided at various places on the vehicle such as at 130 located at the front of the vehicle (FIG. 1) and at 131 and 132 at the rear of the vehicle (FIG. 10).

Figure 15:
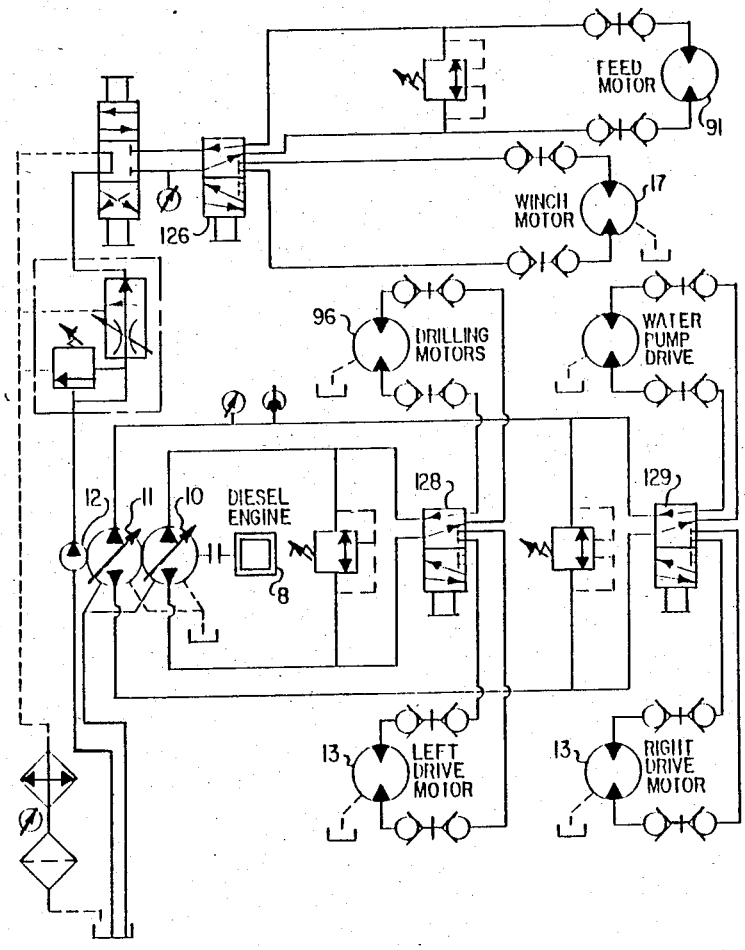
FIG. 15 is an hydraulic schematic for the vehicle of FIG. 1.

The vehicle as described above is operated entirely by hydraulics and those skilled in the art of hydraulics will readily appreciate the manner in which the hydraulic systems may be interconnected from the descriptions provided above. Accordingly, further details with respect thereto have been omitted although a schematic illustrating the hydraulic systems of the vehicle as constructed by the applicants and found to be particularly suitable is shown in FIG. 15.

It is however possible to adapt the present vehicle to utilize mechanical drives.

Although there has been shown and described herein a preferred form of the invention and modifications thereto, it is obvious that many minor changes may be made in the arrangements herein shown and described without departing from the spirit of the invention as set forth in the following claims.

The embodiments of the invention in which an exclusive property or privilege is claimed are defined as follows:

1. A vehicle frame comprising:
    a first sub-frame;
    a second sub-frame rotatably connected to one end of said first sub-frame for pivotal movement about the longitudinal axis of said first sub-frame;
    a walking beam provided along opposite sides of said first sub-frame and disposed in parallel spaced-apart relation thereto;
    means to pivotally connect each of said walking beams at a point intermediate along its length to said first sub-frame for independent pivotal movement of each walking beam about the transverse axis thereof; and
    connecting means comprising a pair of mutually perpendicular sleeves adapted to slidably and rotatably engage and connect the respectively adjacent ends of said walking beams and said second sub-frame to permit the independent pivotal movement thereof about their respective, mutually perpendicular transverse axes.

2. The vehicle frame of claim 1 wherein said means to pivotally connect said walking beams to said first sub-frame comprise a pivot assembly extending transversely across said first sub-frame at a point intermediate the ends thereof.

3. The vehicle frame of claim 2 wherein said pivot assembly includes an outer cylindrical tube supported by said first sub-frame, a concentrically fitting inner tube, the ends of which extend axially beyond the ends of said outer tube, and a sleeve member cooperating with each of the axially extending ends of said inner tube to be rotatable thereabout, each of said sleeve members being adapted for rigid connection to a respective one of said walking beams to pivotally connect said walking beams to said pivot assembly.

4. The vehicle frame of claim 3 wherein each of said sleeve members is adapted for sliding engagement and disengagement with said axially extending ends of said inner tube in the longitudinal direction thereof.

5. The vehicle frame of claim 4 wherein said pivot assembly includes retaining means for rotatably connecting said sleeves to said axially extending ends of said inner tube.

6. The vehicle frame of claim 5 wherein said retaining means comprise a sleeve retaining cap provided at the outer end of each sleeve member, and means for detachably connecting said cap to said pivot assembly.

7. The vehicle frame of claim 6 wherein said respectively adjacent ends of said walking beams and said second sub-frame include a cylindrical member adapted for said sliding, rotatable engagement with respective ones of said mutually perpendicular sleeves.

8. The vehicle frame of claim 7 wherein said mutually perpendicular sleeves comprise first and second superimposed sleeves fixedly connected to one another, one of said first and second sleeves being adapted for slidably and rotatably engaging said cylindrical member extending from the first end of each walking beam in the longitudinal direction thereof, and the other of said first and second sleeves being adapted for slidably and rotatably engaging said cylindrical member provided at said adjacent end of said second sub-frame extending in the longitudinal direction thereof.

9. The vehicle frame of claim 8 wherein said sleeves engaging the ends of said second sub-frame parallel the axially extending ends of said pivot assembly and said sleeve members provided thereon, whereby disconnecting said sleeve members from said pivot assembly enables each of said walking beams to be detached from said first and second sub-frames by lateral movement of said walking beams away therefrom.

10. The vehicle frame of claim 9 wherein said second sub-frame comprises a transversely mounted elongated rod member, the ends of which are slidably and rotatably engaged by one of said mutually perpendicular sleeves.

11. The vehicle frame of claim 10 wherein each of said walking beams includes at least two drive units provided therein, each of said drive units including a transversely extending shaft for supporting a ground-engaging member thereon.

12. The vehicle frame of claim 11 wherein said sleeve members are rigidly connected to said walking beams at a point approximately two-thirds the distance from said first ends thereof.

13. A vehicle for off-road use comprising:
a first sub-frame;
a second sub-frame rotatably connected to one end of said first sub-frame for pivotal movement about the longitudinal axis of said first sub-frame;
a walking beam provided along opposite sides of said first sub-frame and disposed in parallel spaced apart relation thereto;
means to pivotally connect each of said walking beams at a point intermediate along its length to said first sub-frame for independent pivotal movement of each walking beam about the transverse axis thereof;
connecting means comprising a pair of mutually perpendicular sleeves adapted to slidably and rotatably engage and connect the respectively adjacent ends of said walking beams and said second sub-frame to permit the independent pivotal movement thereof about their respective, mutually perpendicular transverse axes;
a plurality of ground engaging wheel means provided on each of said walking beams;
drive means for rotating said wheel means; and
a prime mover mounted on said vehicle for actuating said drive means.

14. The vehicle of claim 13 wherein said means to pivotally connect said walking beams to said first sub-frame comprise a pivot assembly extending transversely across said first sub-frame at a point intermediate the ends thereof.

15. The vehicle of claim 14 wherein said pivot assembly includes an outer cylindrical tube supported by said first sub-frame, a concentrically fitting inner tube, the ends of which extend axially beyond the ends of said outer tube, and a sleeve member cooperating with each of the axially extending ends of said inner tube to be rotatable thereabout, each of said sleeve members being adapted for rigid connection to a respective one of said walking beams to pivotally connect said walking beams to said pivot assembly.

16. The vehicle of claim 15 wherein each of said sleeve members is adapted for sliding engagement and disengagement with said axially extending ends of said inner tube in the longitudinal direction thereof.

17. The vehicle of claim 16 wherein said pivot assembly includes retaining means for rotatably connecting said sleeves to said axially extending ends of said inner sleeve.

18. The vehicle of claim 17 wherein said retaining means comprise a sleeve retaining cap provided at the outer end of each sleeve member, and means for detachably connecting said cap to said pivot assembly.

19. The vehicle of claim 18 wherein said respectively adjacent ends of said walking beams and said second sub-frame include a cylindrical member adapted for said sliding, rotatable engagement with respective ones of said mutually perpendicular sleeves.

20. The vehicle of claim 19 wherein said mutually perpendicular sleeves comprise first and second superimposed sleeves fixedly connected to one another, one of said first and second sleeves being adapted for slidably and rotatably engaging said cylindrical member extending from the first end of each walking beam in the longitudinal direction thereof, and the other of said first and second sleeves being adapted for slidably and rotatably engaging said cylindrical member provided at said adjacent end of said second sub-frame extending in the longitudinal direction thereof.

21. The vehicle of claim 20 wherein said sleeves engaging the ends of said second sub-frame parallel the axially extending ends of said pivot assembly and said sleeve members provided thereon, whereby disconnecting said sleeve members from said pivot assembly enables each of said walking beams to be detached from said first and second sub-frames by lateral movement of said walking beams away therefrom.

22. The vehicle of claim 21 wherein said second sub-frame comprises a transversely mounted elongated rod member, the ends of which are slidably and rotatably engaged by one of said mutually perpendicular sleeves.

23. The vehicle of claim 22 wherein each of said walking beams includes at least two drive units provided therein, each of said drive units including a transversely extending shaft for supporting a ground-engaging member thereon.

24. The vehicle of claim 23 wherein said sleeve members are rigidly connected to said walking beams at a point approximately two-thirds the distance from said first ends thereof.

25. The vehicle of claim 13 wherein said drive means include a plurality of drive units provided in each walking beam, said drive units each having a transversely extending shaft for supporting one of said wheel means thereon.

26. The vehicle of claim 25 wherein said drive means further include motor means actuatable by said prime mover to rotate said shafts.

27. The vehicle of claim 26 wherein said motor means are connected to one of said shafts for rotation thereof, said one of said shafts being connected to the remaining of said shafts for rotation thereof.

28. The vehicle of claim 27 wherein three equally spaced apart of said shafts extend from each of said walking beams, the central of said shafts being rotated by said motor means and the outwardly displaced shafts being chain driven.

29. The vehicle of claim 27 wherein said prime mover comprises an internal combustion engine and hydraulic pump means connected thereto and wherein said motor means comprise an hydraulic motor driven by said hydraulic pump means.

30. The vehicle of claim 29 wherein said motor means provided on each of said walking beams is independently actuatable to control the back and forth and turning movements of said vehicle.

31. The vehicle of claim 30 including drilling means mounted on said first sub-frame said drilling means including a derrick, a screw feed assembly supportable in an upright drilling position thereof by said derrick and a drill motor supported by said screw feed assembly for up and down drilling movements thereof.

32. The vehicle of claim 31 wherein said derrick includes a base portion fixedly connected to said first sub-frame and an upper portion pivotally connected to said base portion, said upper portion being pivotable between an upright drill supporting position and a substantially horizontal reclining position.

33. The vehicle of claim 32 further including control means for said hydraulic pumps mounted on said upper portion of said derrick whereby said control means move with said upper portion from a first position when said upper portion is in the upright position thereof to a second driver-accessible position when said upper portion is in the reclining position thereof and the vehicle is in said drive mode.

34. The vehicle of claim 32 wherein the upper portion of said derrick is dismantleable into at least two smaller segments to facilitate the transport thereof.

35. The vehicle of claim 27 wherein said prime mover comprises an internal combustion engine and first and second hydraulic pumps connected thereto and wherein said motor means in each walking beam comprise a hydraulic motor driven by a respective one of said first and second hydraulic pumps.

36. The vehicle of claim 35 wherein each of said hydraulic motors is independently actuatable to control back and forth and turning movements of said vehicle.

37. The vehicle of claim 36 including drilling means mounted on said first sub-frame, said drilling means including a derrick, a screw feed assembly supportable in an upright drilling position by said derrick and a drill motor supported by said screw feed assembly for up and down drilling movements thereof whereby said vehicle is operable in either a drive mode wherein said wheel means are rotated to move said vehicle or a drill mode wherein said drilling means are utilized for drilling purposes.

38. The vehicle of claim 37 further including winch means and a drilling fluid pump.

39. The vehicle of claim 38 wherein said prime mover means include a third hydraulic pump whereby said first, second and third hydraulic pumps are operable in the drill mode of said vehicle to independently actuate said drill motor, said drilling fluid pump and said screw feed assembly.

40. The vehicle of claim 39 wherein said third hydraulic pump is operable in either the drill or drive mode of said vehicle to actuate said winch means.

41. The vehicle of claim 39 wherein said screw feed assembly is supportable in a slightly forwardly reclined drill hoisting position thereof by said derrick.

42. The vehicle of claim 41 wherein said screw feed assembly is pivotally connected to said first sub-frame for pivotable movement between said upright and slightly forwardly reclined positions thereof and a more forwardly reclined position when said vehicle is in said drive mode thereof.

43. The vehicle of claim 42 wherein said derrick includes a base portion fixedly connected to said first sub-frame and an upper portion that is pivotable between an upright drill supporting position and a substantially horizontal reclining position.

44. The vehicle of claim 43 further including a driver's seat detachably connectable to said first sub-frame when said derrick means occupy the substantially horizontal position thereof and said screw feed means are in said more forwardly reclined position thereof.

45. The vehicle of claim 43 further including a driver's seat detachably connectable to said first sub-frame when said derrick means occupy the substantially horizontal position thereof and said screw feed means are in said more forwardly reclined position thereof.

46. The vehicle of claim 43 further including control means for said hydraulic pumps mounted on said upper portion of said derrick whereby said control means move with said upper portion from a first position when said upper portion is in the upright position thereof to a second driver-accessible position when said upper portion is in the reclining position thereof and the vehicle is in said drive mode.

47. A vehicle frame comprising:

a first elongated sub-frame;
a second sub-frame rotatably connected to one end of said first sub-frame for pivotal movement about the longitudinal axis of said first sub-frame;
a walking beam provided at each of the elongated sides of said first sub-frame and disposed in parallel, spaced apart relation thereto;
a walking beam pivot assembly extending transversely across said first sub-frame adjacent the other end thereof, each of said walking beams being pivotally connected at a point intermediate along its length to a respective outer end of the pivot assembly for independent pivotal movement of each walking beam in the vertical plane thereof, said pivot assembly including an outer cylindrical tube supported by said first sub-frame, a concentrically fitting inner tube the ends of which extend axially beyond the ends of said outer tube and a sleeve member rotatably, slidably disposed about the axially extending ends of said inner tube, said sleeve member being adapted for rigid connection to a respective one of said walking beams to thereby pivotally connect said walking beam to said pivot assembly; and
connecting means joining a first end of each of said walking beams to the adjacent end of said second sub-frame to permit the simultaneous pivotal movement of said walking beams and said second sub-frame in their respective mutually perpendicular vertical planes, said connecting means comprising first and second superimposed mutually perpendicular sleeves fixedly connected to one another, one of said first and second sleeves being adapted for slidably engaging a cylindrical member extending longitudinally from the first end of each walking beam and the other of said first and second sleeves being adapted for slidable engagement with a transversely extending cylindrical member provided at said adjacent end of said second sub-frame.

48. A vehicle for off-road use comprising:
a first elongated sub-frame;
a second sub-frame rotatably connected to one end of said first sub-frame for pivotal movement about the longitudinal axis of said first sub-frame;
a walking beam provided at each of the elongated sides of said first sub-frame and disposed in parallel, spaced apart relation thereto;
a walking beam pivot assembly extending transversely across said first sub-frame adjacent the other end thereof, each of said walking beams being pivotally connected at point intermediate along its length to a respective outer end of the pivot assembly for independent pivotal movement of each walking beam in the vertical plane thereof, said pivot assembly including an outer cylindrical tube supported by said first sub-frame, a concentrically fitting inner tube the ends of which extend axially beyond the ends of said outer tube and a sleeve member rotatably, slidably disposed about the axially extending ends of said inner tube, said sleeve members being adapted for rigid connection to a respective one of said walking beams to thereby pivotally connect said walking beams to said pivot assembly;
connecting means joining a first end of each of said walking beams to the adjacent end of said second sub-frame to permit the simultaneous pivotal movement of said walking beams and said second sub-frame in their respective, mutually perpendicular vertical planes, said connecting means comprising first and second superimposed mutually perpendicular sleeves fixedly connected to one another, one of said first and second sleeves being adapted for slidably engaging a cylindrical member extending longitudinally from the first end of each walking beam and the other of said first and second sleeves being adapted for slidable engagement with a transversely extending cylindrical member provided at said adjacent end of said second sub-frame;
a plurality of ground engaging wheel means provided on each of said walking beams;
drive means for rotating said wheel means, and
a prime mover mounted on said vehicle for actuating said drive means.

* * * * *